United States Patent [19]
Levenson et al.

[11] Patent Number: 5,331,353
[45] Date of Patent: Jul. 19, 1994

[54] DEVICE FOR LIMITING THE AMOUNT OF TIME AN ELECTRICAL APPLIANCE SUCH AS A TELEVISION MAY BE USED

[75] Inventors: Randal P. Levenson, Miami, Fla.; James D. Kennedy; Zach D. Cox, Jr., both of Raleigh, N.C.; Frank A. Browne, Ardmore, Pa.

[73] Assignee: Mindmaster Inc., South Miami, Fla.

[21] Appl. No.: 28,792

[22] Filed: Mar. 9, 1993

Related U.S. Application Data

[63] Continuation-in-part of Ser. No. 26,044, Mar. 5, 1993, abandoned, which is a continuation-in-part of Ser. No. 850,358, Mar. 10, 1992, abandoned.

[51] Int. Cl.$^5$ .............................................. H04N 5/44
[52] U.S. Cl. .................................................. 348/725
[58] Field of Search ............... 358/188, 190, 194.1, 358/86; 340/309.15; 348/725, 730, 734; H04N 5/44, 5/63

[56] References Cited

U.S. PATENT DOCUMENTS

| | | | |
|---|---|---|---|
| 3,581,029 | 5/1971 | Noiles | 200/38 |
| 4,246,495 | 1/1981 | Pressman | 307/141 |
| 4,348,696 | 9/1982 | Beier | 358/188 |
| 4,386,436 | 5/1983 | Kocher et al. | 358/194.1 |
| 4,689,619 | 8/1987 | O'Brien, Jr. | 358/86 |
| 4,956,825 | 9/1990 | Wilts et al. | 368/9 |
| 5,046,157 | 9/1991 | Smith et al. | 340/309.15 |
| 5,051,837 | 9/1991 | McJunkin | 358/188 |
| 5,097,249 | 3/1992 | Yamamoto | 358/194.1 |
| 5,231,310 | 7/1993 | Oh | 358/188 X |

FOREIGN PATENT DOCUMENTS 2041586  9/1980  United Kingdom ........ G04C 23/18

Primary Examiner—Mark R. Powell
Assistant Examiner—John W. Miller
Attorney, Agent, or Firm—Richard S. Faust

[57] ABSTRACT

An electronic control device is connected in the power supply line to an electrical appliance to limit the amount of time the appliance can be used. In the illustrated embodiments, the invention permits a television to be put under parental control in order to limit the viewing time of each child in the family to a predetermined "allowance," for example, ten hours per week. The allowance is automatically refreshed at the end of each week. A current sensing circuit is included in the device to enable the device to monitor the on/off status of the television under control. The provision of the on/off information enables the control device to operate with numerous advantages, including permitting each child to simply turn off the television when he has completed his viewing without the necessity of "signing off" at the control device. Also disclosed is a system for controlling multiple televisions in a household by providing a master control device at one television and a slave control device at each remote television.

19 Claims, 12 Drawing Sheets

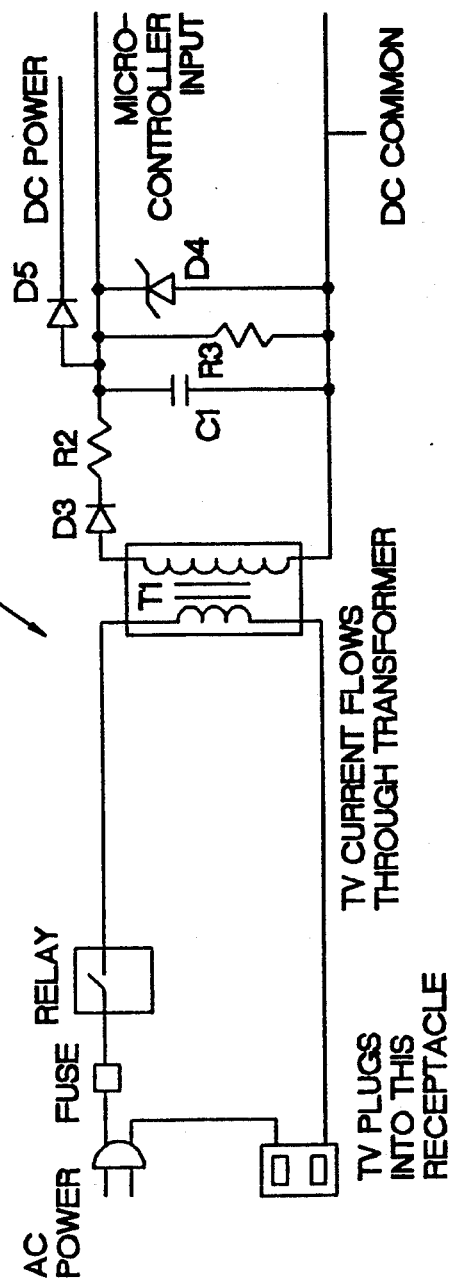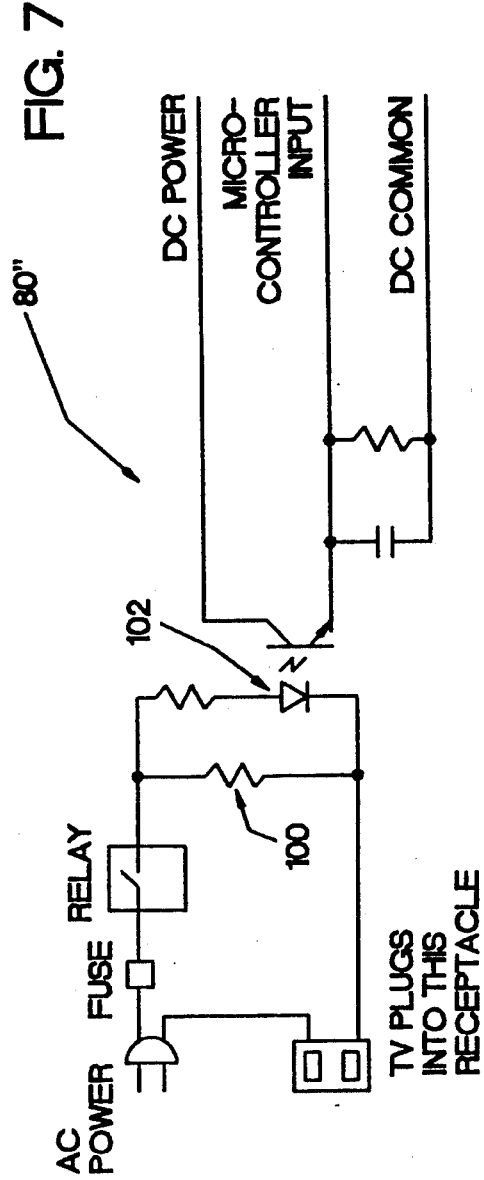

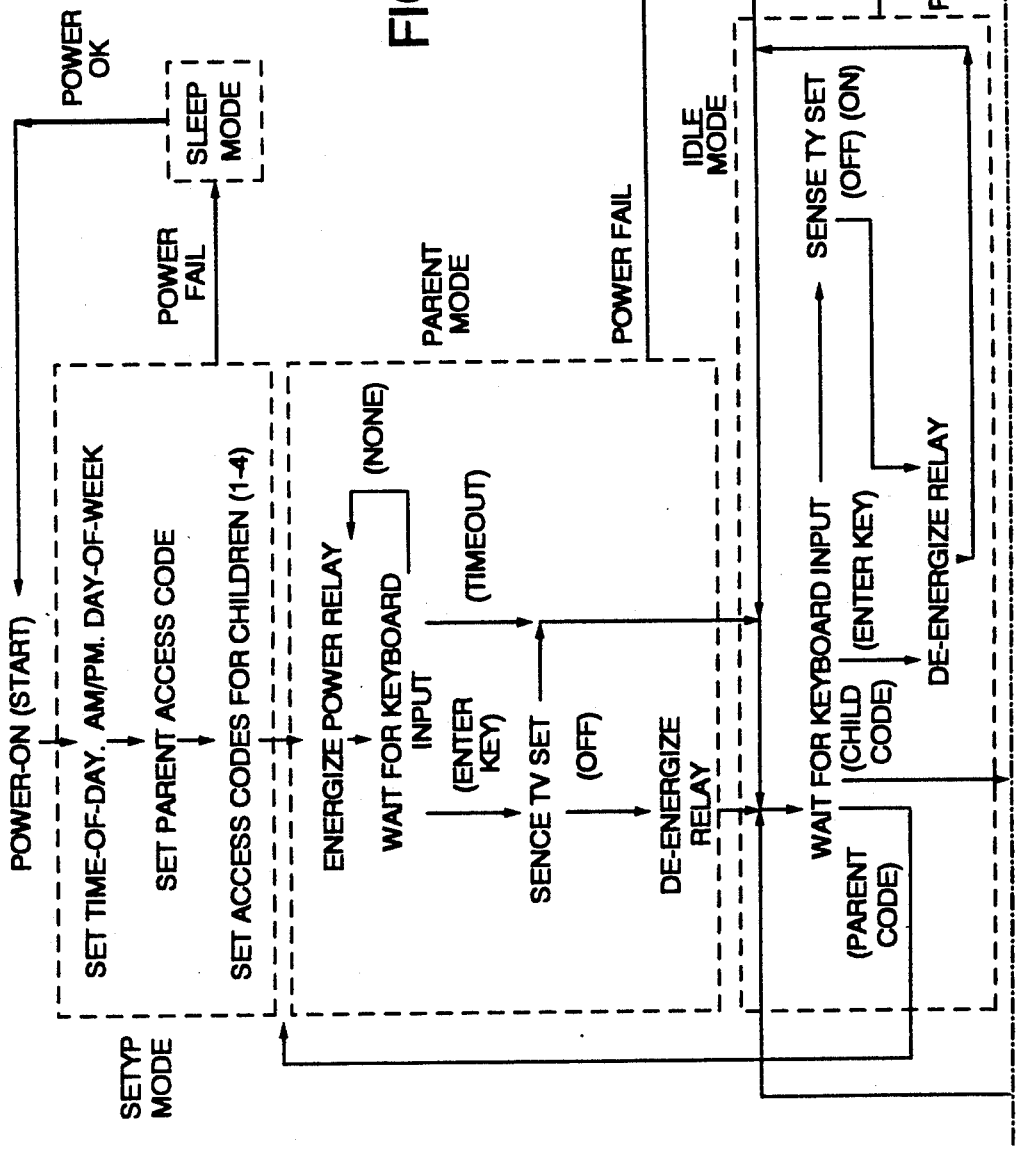

DEVICE FOR LIMITING THE AMOUNT OF TIME AN ELECTRICAL APPLIANCE SUCH AS A TELEVISION MAY BE USED

This is a continuation-in-part of U.S. patent application Ser. No. 08/026,044 filed Mar. 5, 1993, now abandoned, which is a continuation-in-part of U.S. patent application Ser. No. 07/850,358, filed Mar. 10, 1992, now abandoned.

FIELD OF THE INVENTION

The invention relates to devices used to control access to an electrical appliance. In particular embodiments, the invention relates to devices that enable parents to limit time spent by their children viewing television.

BACKGROUND OF THE INVENTION

For many years, parents have struggled with finding a workable way to control the amount of time their children spend in front of the television set. Reduced television viewing in the household is known by child development experts and parents alike to promote family togetherness, increase reading time, increase the appreciation of reading and improve scholastic grades, among other benefits.

Early attempts in controlling television viewing time, dating back to the advent of home television, include various attempts at temporarily disabling televisions. Also used have been parental directives, which, of course, were difficult to enforce during parental absences.

Beier U.S. Pat. No. 4,348,696 and Smith et al U.S. Pat. No. 5,046,157 disclose television viewing control devices permitting parental control over television viewing time of a plurality of children. However, these devices appear to have numerous drawbacks and have not gained commercial acceptance.

One primary disadvantage of known television viewing control devices is that they do not contain an information loop with the television that informs the device whether the television is in an on or off condition. Thus, when a child decides to stop watching television and he simply turns off the television—without "signing off" at the control device—his account will continue to be debited by the control device. This results in a lack of integrity in the overall operation of the system because a child is likely to occasionally, if not frequently, simply turn the television off without regard to the control device. Thus, there is a need for a more user friendly and practical television control device that prevents a child who simply turns off the television from losing his entire allotment or allowance of viewing time. This and other advantages flow from such a current sensing system.

Another drawback of prior television viewing control devices is that their use as teaching tools is not optimized. For example, the prior art devices automatically replenish the child's time allowance at the end of each daily or weekly viewing period to a predetermined level, for example, two hours. Thus, the child has no incentive to "save up" time from one viewing period to the next and thereby learn the valuable lessons associated with saving.

Another disadvantage of known television control devices is that they do not address the reality that many households have multiple televisions. In such households, a television control device connected to only one television does nothing to prevent a child from exceeding his viewing allowance by simply tuning in to a different television. Likewise, providing multiple television control devices (one per television) is also unsatisfactory since this leads to maintaining accounts on several control units or restricting television viewers to specific sets. Thus, there is a need for a system that permits a multiple television household, where desired, to control a child's total viewing through a single time allowance while giving the child access to all televisions in the house.

SUMMARY OF THE INVENTION

In its broadest sense, the invention is a device for limiting access to an electrical appliance so that it may be used only a specified amount of time per month, per week or per day. The invention finds its primary utility in providing parents with a means of limiting time spent by their children viewing television.

The television control device of the invention works by interrupting AC power to the television when a programmed allotment of viewing time has been used. The time allotment (or "allowance") is automatically replenished on a weekly basis. The television is plugged into an AC receptacle located inside a locked compartment in the device, which is then plugged into the household AC receptacle.

The parent programs into the device an access code and weekly time allotment for each child (up to a predetermined maximum, for example, four children); the children enter their respective access codes in order to use the television. When a valid code is entered, if there is time remaining in the child's account, then AC power is applied to the television. When the television is turned on, then the device begins to debit the child's time account on a minute-by-minute basis. If the television is subsequently turned off, the device will stop debiting the account, and remove AC power from the television.

Access codes, account balances, and weekly allowances are normally set at power-up, but can be modified at any time through the use of PARENT MODE which is accessed by the parent with a programmable password.

The television control device includes a current sensing circuit that continuously informs the device as to whether the television is in an on or off condition. This information provides significant advantages in the overall operation of the device, including the advantage of permitting a child to simply turn the television off when he has completed his viewing, without worrying about the control device continuing to decrement his account.

The control device of the invention also includes a "Roll Over" feature that permits a child to "save up" time from one viewing period to the next. Utilization of the device's Roll Over feature changes the usual operation of the device so that the initial value of the weekly time allowance is added to the allowance time remaining at midnight of day 7 instead of that initial value replacing the time remaining. Thus, the child can learn the value of saving up time from one viewing period to the next.

In another aspect, the invention is directed to a system wherein one master television control device communicates with one or more slave television control devices that are located at additional televisions in the house. Each slave unit has its own current sensing circuit so that the on/off control and allowance functions may be conveniently extended to one or more remote televisions. Thus, in a multiple television household it is possible to control a child's total viewing through a single time allowance while giving the child access to all televisions in the house.

BRIEF DESCRIPTION OF THE DRAWINGS

FIG. 6 is a schematic representation of a first alternative embodiment of the current sensing circuit.

FIG. 7 is a schematic representation of a second alternative embodiment of the current sensing circuit.

FIG. 8 comprising FIGS. 8a and 8b is an operational flow chart of the device illustrated in FIGS. 1-4.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
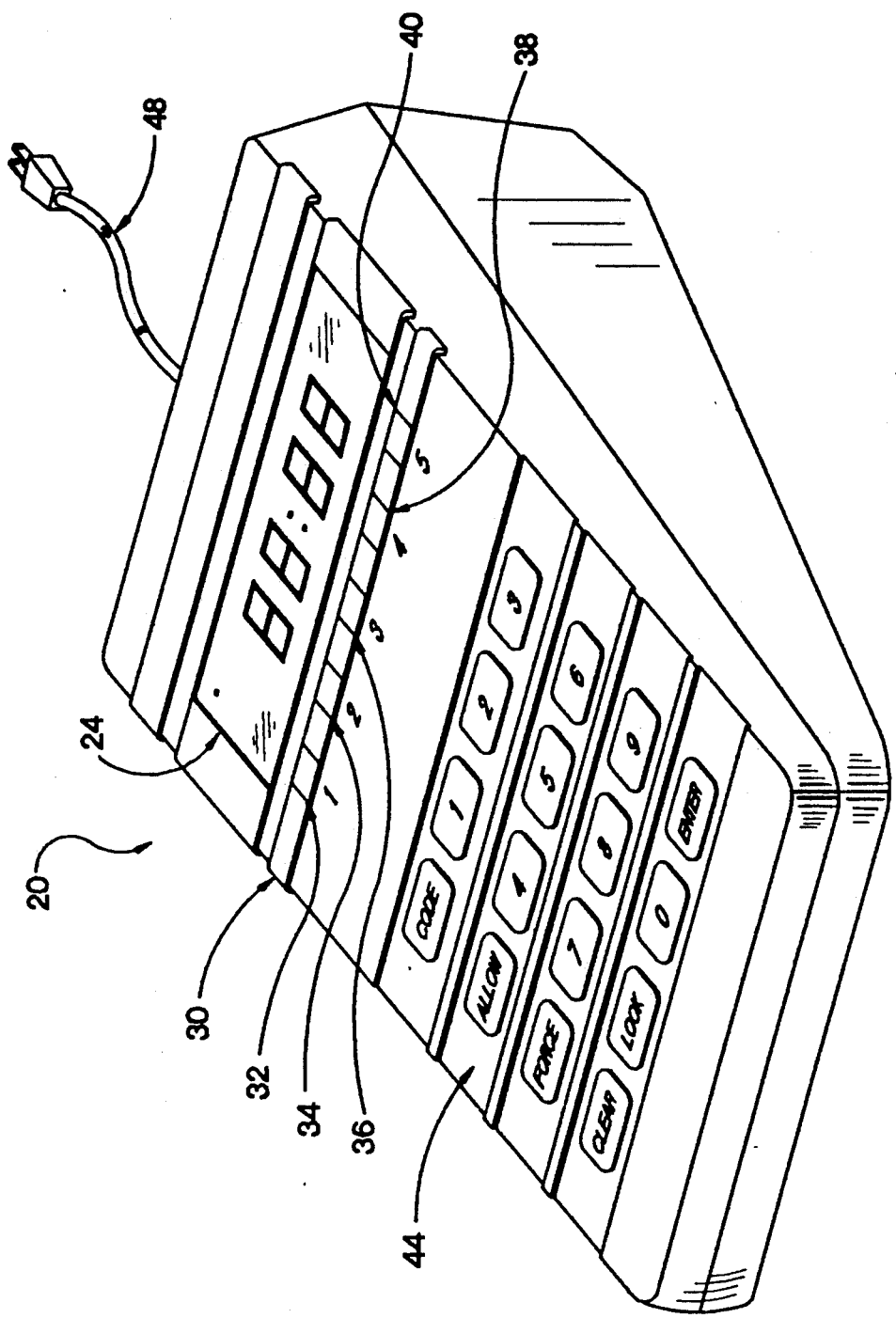
FIG. 1 is a front pictorial view of a device of the invention that has primary utility in enabling parents to limit the time spent by children viewing television.
Figure 2:
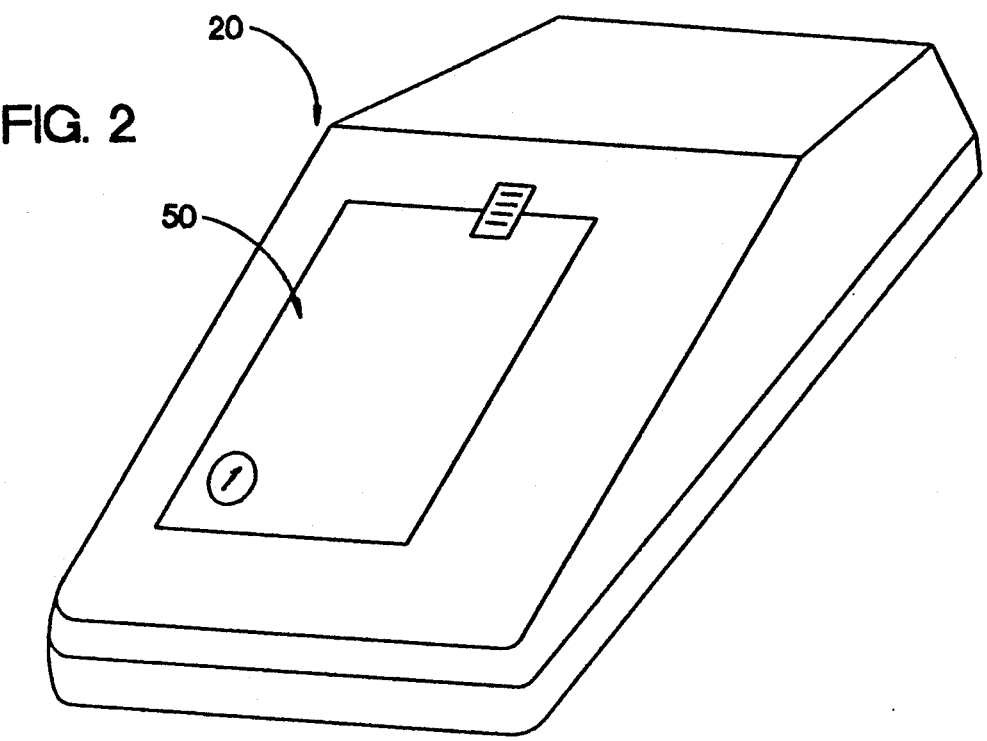
FIG. 2 is a rear pictorial view of the television control device illustrated in FIG. 1.
Figure 3:
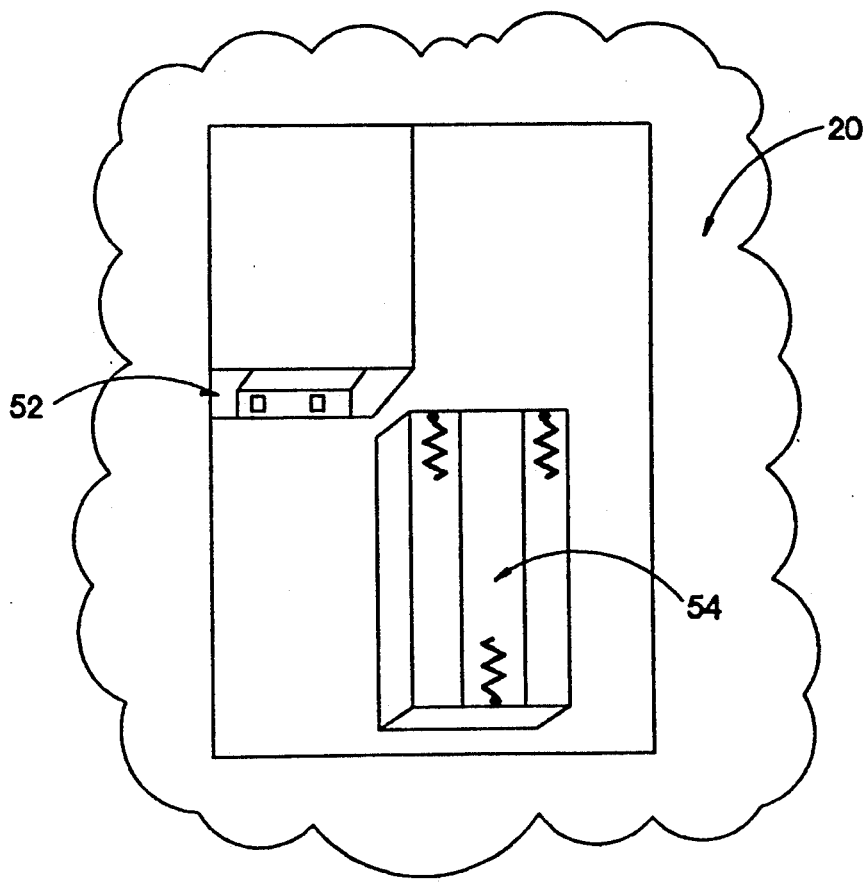
FIG. 3 is an enlarged view of a portion of the rear of the device illustrated in FIGS. 1 and 2 and showing the access hatch removed, thereby revealing the battery holder and the AC receptacle for the television power line.

Referring to the drawings, and particularly to FIGS. 1-3, there is shown a television control device 20 constructed in accordance with the principles of the present invention. Device 20 includes a high-impact plastic enclosure which serves as the package for the electronics of the device. The principal physical features of device 20 will be described as follows:

A four-digit numeric display window 24 is used to show time-of-day in normal operation and to show other information when the device 20 is being programmed. In addition to the four-digits, display window 24 includes displays for an AM/PM indicator and a colon separator between hours and minutes.

A child indicator 30 includes four individual lights 32, 34, 36, 38 which are illuminated to indicate which child is currently using the television.

A parent indicator 40 includes a single indicator light which is illuminated when the device is in its "Parent Mode."

A keyboard 44 includes an array of sixteen buttons located on the top of the unit which are used in the operation and programming of device 20.

A power cord 48 provides AC power for the television and the internal circuits of device 20.

An access door 50 (FIG. 2) takes the form of a keylocked panel which, when opened, provides access to an AC receptacle 52 and battery holder 54. AC receptacle 52 provides switched AC power to the television. Battery holder holds three AAA batteries (not shown in FIG. 3) that provide back-up power so that the programming information and time-of-day are maintained through power outages.

Circuit Description

Figure 4:
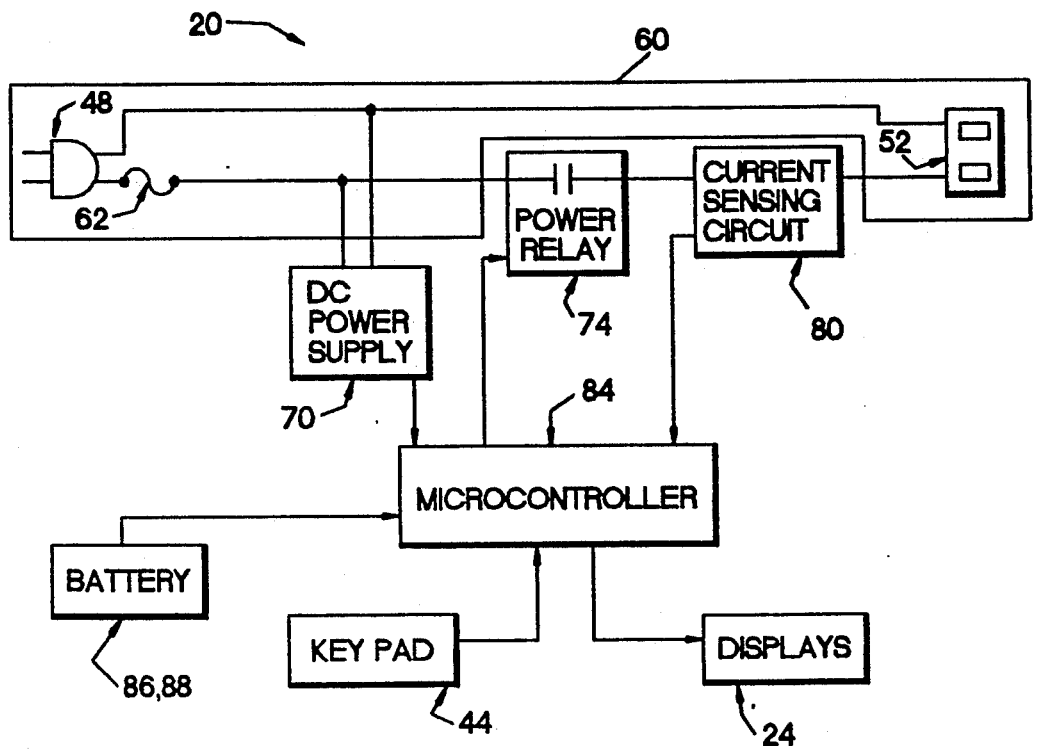
FIG. 4 is a block diagram of the principal functional areas of the device illustrated in FIGS. 1-3.

Electrically, the device consists of eight functional areas, as shown in FIG. 4. These areas are:

1. Power input and output 60 consists of a means for connecting the device to the AC mains (power cord 48), a means for connecting the television to the control device 20 (AC receptacle 52), and an overload protection means (fuse 62).
2. DC power supply 70 converts from the AC mains to the DC levels required by the circuits internal to the device.
3. Power relay 74 is the means by which the device controls AC power to the television.
4. Current sensing circuit 80 is the means for providing information to device 20 concerning the on/off status of the television under control.
5. Microcontroller 84 serves as the means for implementing the control functions of the device. Microcontroller 84 includes a firmware program, memory for storing access codes and time accounts, a means of accurately keeping time, and a means for executing its stored program. In the preferred embodiment of device 20, a "single-chip" microcontroller such as the Zilog Z86C19, manufactured by Zilog, Inc. of Campbell, Calif., U.S.A., is used. Microcontroller 84 has inputs from current sensing circuit 80 and keyboard 44, and has outputs to power relay 74 and display window 24.
6. Batteries 86, 88 serve as means for maintaining the account balances, time-of-day, and access codes throughout a power outage. As mentioned above, the batteries are installed in battery holder 54 which is located in the locked compartment in the bottom of the device.
7. Keyboard 44 provides means for the child users to input access codes, and for the parent to modify or display the access codes and account balances. In the preferred embodiment, keyboard 44 consists of sixteen (16) pushbuttons. Keyboard 44 is continuously scanned by microcontroller 84 for user input.
8. Display 24 provides means for showing information. As mentioned above, the display consists of a four-digit numeric display, with AM indicator and colon (for a digital clock-like display), in addition to four child indicator lights and one parent indicator light. Information is written to the displays by microcontroller 84 in the manner described below in the "Operation" portion of this description.

Structure and Function of the Current Sensing Circuit

Figure 5:
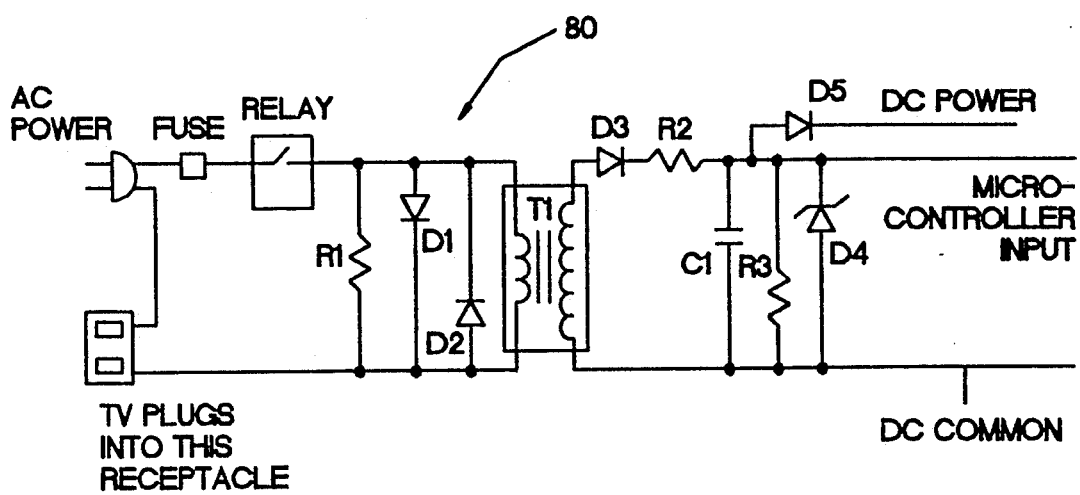
FIG. 5 is a schematic representation of a preferred embodiment of the current sensing circuit utilized in the device of FIGS. 1-4 to determine when current is flowing to the television.

In the preferred embodiment of device 20, current sensing circuit 80 shown in FIGS. 4 and 5 is used to detect if the television is turned on. The purpose of circuit 80 is to convert AC current (input) into a DC voltage (output). The DC voltage produced is such that the microcontroller 84 senses different logic levels for television on and television off conditions. The structure and operation of current sensing circuit 80 are as follows:

1. When the television is turned on and power is being applied through the power relay 74, current flows through resistor R1 (0.5 ohm). This produces an electrical voltage whose amplitude is proportional to the amount of current flow.
2. Transformer T1 (a 1:11.2 transformer) provides isolation between the AC line and the low-voltage resistor voltage and acts as a "step-up." (A small voltage on the R1 side of transformer T1 turns into a larger voltage on the other side.)
3. Diode D3 and capacitor C1 (1 µF) rectify and average the voltage output of T1. Resistor R3 (100 K ohm) provides a discharge path for capacitor C1 which allows the capacitor charge to bleed off when the television current stops.
4. Diodes D4 (5.1 v zener diode) and D5 act as clamps to limit the output of circuit 80 to voltages compatible with the microcontroller input signals. Resistor R2 (1 K ohm) serves to limit the current flow through Diode D3 and transformer T1 when the clamping diodes are active.
5. Diodes D1 and D2 limit the voltage drop across R1, and therefore limit the power dissipated in R1. This allows the circuit to sense relatively small current flow without generating a lot of heat at higher current levels.

FIGS. 6 and 7 show first and second alternative approaches to current sensing circuits. According to current sensing circuit 80' of FIG. 6, the television current flows through the primary winding of a current-sense transformer. This current induces a smaller, proportional current in the secondary winding. That current is rectified, filtered, and voltage-limited using circuit components similar to those illustrated in FIG. 5. While similar to the previously described circuit, circuit 80' of FIG. 6 relies on current coupling as opposed to voltage coupling.

According to the second alternative current sensing circuit 80" of FIG. 7, the television current induces a voltage in resistor 100. When that voltage exceeds the turn-on voltage of an associated opto-isolator 102, then the output transistor of the opto-isolator is turned on, which tells microcontroller 84 that current is flowing and, therefore, the television is on.

In each circuit 80, 80', 80", the components are so chosen as to detect current levels only above the threshold levels associated with the "keep warm" or "keep alive" currents used in modern televisions to maintain the picture tube in a ready state. In a preferred embodiment, circuit 80 is designed to properly differentiate between ON and OFF status for television sets rated 60 watts or more.

A current sensing circuit is a preferred means for continuously informing the control device of the on/off status of the television under its control. As will become more apparent from the "Operation" portion of the detailed description, immediately below, this on/off information is utilized in several ways to enhance the performance and capabilities of the control device. Among the several advantages achieved are (1) the added integrity of the system due to the fact that a child can simply turn the television off without concern about "signing off" on the control device—recognizing that many children can not be relied upon to unfailingly remember to engage the control device when they wish to stop viewing television, (2) facilitating the sequencing in and out of the five operational states of the device, (3) the capability of providing master-slave architecture for multiple television households with slave units that can reliably inform the master unit as to the on/off condition of the remote televisions and (4) the capability of operating the control device in a "nominally on" manner as discussed later in this description.

Operation of the Device

Figure 8B:
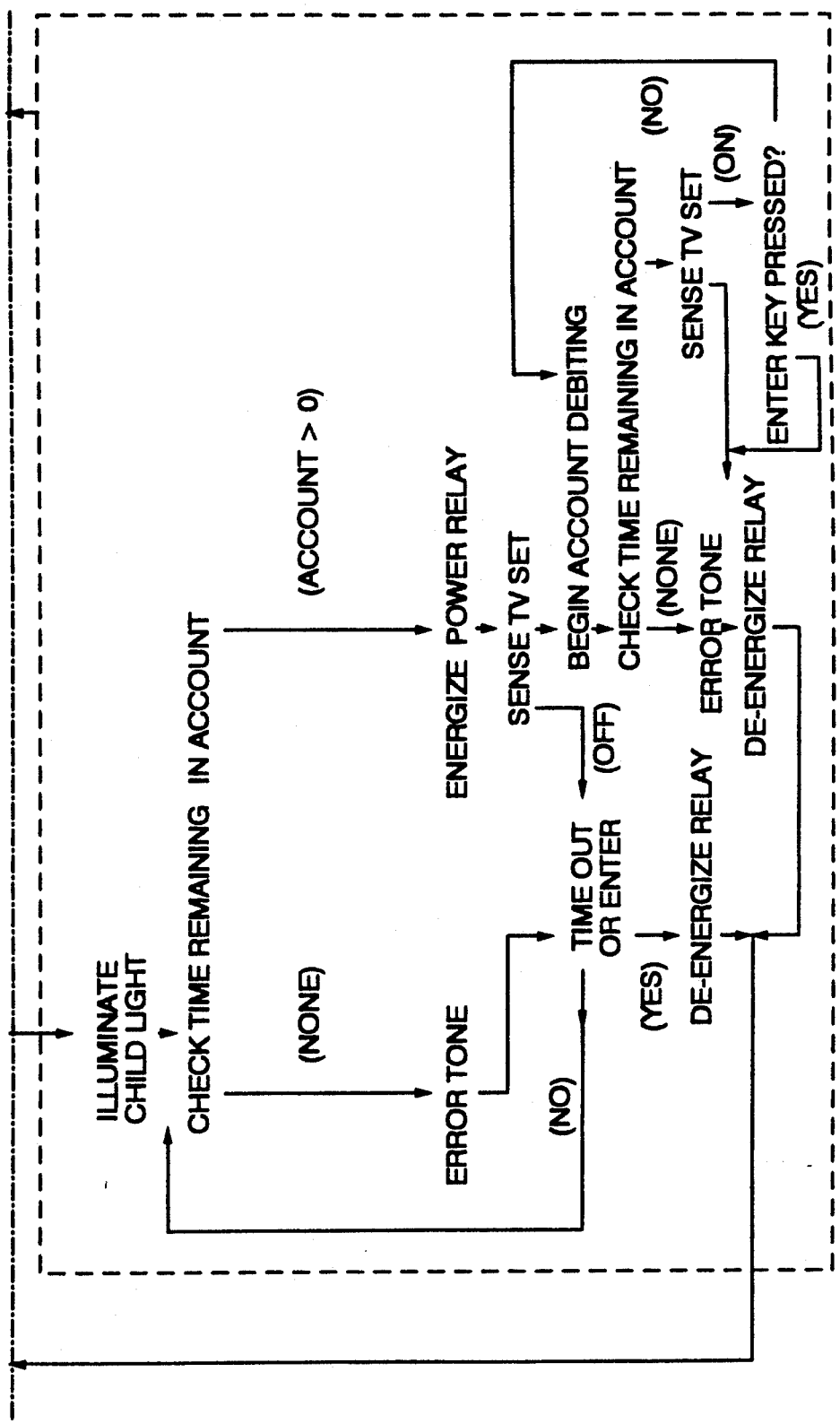

Referring to the flowchart of FIG. 8, the description will now turn to a detailed discussion of the operation of device 20. Since the device is always in one of five modes, the operational description will focus on how the device enters and exits each mode and the function of each mode.

When the device is first powered on, it is in "SETUP MODE," has no programming data such as access codes and time allowances stored in its memory and must be initialized by the user.

Setup Mode s1. The display blinks "12:00" to indicate that the time-of-day needs to be input into the device. The user presses the number keys to set hours and minutes, followed by the "ENTER" key.

s2. The display then blinks the time, which indicates that AM or PM needs to be input. This is done by pressing the "CLEAR" key (which toggles the AM indicator on/off). When that has been done, the user presses "ENTER."

s3. The display then prompts the user for day-of-week, by showing "DAY." The user then presses a number key (1–7), followed by "ENTER." The device automatically updates the time accounts at the end of Day 7.

s4. The device then prompts for the parent access code by displaying "PA." The four-digit code is input by pressing the number keys, followed by "ENTER."

s5. The device then prompts for the access code which will be used by child 1, by displaying "C1." The four-digit code is input by pressing the number keys, followed by "ENTER."

s6. After entry of the child's access code, the device prompts for the weekly time allowance for that child, by displaying "A1." The allowance (hours and minutes) is input with the number keys, followed by "ENTER."

s7. The access codes and time allowance for other children, up to four, are input in a similar fashion.

s8. After all access codes and allowances are entered, power relay 74 is energized enabling power to the television set, and the device enters "PARENT MODE."

s9. If the device senses that AC power goes away, the device enters "SLEEP MODE." When power is restored, the device will re-enter setup mode.

Parent Mode

The device enters PARENT MODE automatically at the completion of all input steps in SETUP MODE or when the parent code is entered from the keyboard. In PARENT MODE, no account debiting occurs (i.e., free television time).

In PARENT MODE, the relay is always energized, which means that power is applied to the television. In this mode, the parent can view or modify the access codes, weekly allowances, and actual account balances. Parent mode is denoted by the illumination of the parent light 40.

p1. The "LOOK" key is used to view access codes, allowances, and account balances. The parent presses "LOOK," followed by the number key (1-4) corresponding to the child. The device illuminates the appropriate child LED, and will then sequence through the following displays (until the "ENTER" key is pressed):
A1
allowance (HOURS:MINUTES)
F1
account balance (HOURS:MINUTES)
C1
access code p2. When in PARENT MODE, pressing the "CLEAR" key will cause the device to prompt for a new time-of-day and day-of-week setting which may be accomplished in accordance with SETUP MODE paragraphs s1-s3, above.

p3. The "FORCE" key is used in PARENT MODE to cause a new account balance to be stored into a child's account. The FORCE key is pressed, followed by the child number (1-4). The device illuminates the appropriate child LED, and flashes "F1." The parent then enters a new account balance (hours and minutes), followed by "ENTER."

p4. The "ALLOW" key is used in PARENT MODE to change the child's weekly time allowance. The ALLOW key is pressed, followed by the child number (1-4). The device illuminates the appropriate child LED, and flashes "A1." The parent then enters the new weekly allowance (hours and minutes), followed by "ENTER." This new allowance will be stored in the child's account at the end of the week (midnight of Day 7).

p5. The "CODE" key is used in PARENT MODE to cause a new access code to be assigned for a child's account. The CODE key is pressed, followed by the child number (1-4). The device illuminates the appropriate child LED and flashes "C1." The parent then enters a new access code (4-digit), followed by "ENTER."

p6. The "ENTER" key, used alone, causes the device to exit from PARENT MODE to IDLE MODE. If the device senses that the television is actually turned on, then the relay is left in the energized state and therefore, the television stays on. However, if the device senses that the television was off when "ENTER" was pressed, then the relay is de-energized, which removes AC power from the television.

p7. The device implements a time-out feature for PARENT MODE, which automatically exits to IDLE MODE if no keys are pressed for a predetermined amount of time. The rules for television on/off are the same as those in paragraph p6, above.

p8. If the device senses that AC power goes away, the device enters SLEEP MODE. When power is restored, the device will go to IDLE MODE with power relay 74 de-energized.

p9. According to the usual operation of the control device as described above, the time remaining in a weekly time allowance is set to the initial value of the time allowance on midnight of day 7. However, the operation of the device may be changed so that the initial value of the weekly time allowance is added to the time remaining at day 7, thereby permitting a child to "save up" time from one viewing period to the next. Implementation of this Roll Over feature involves first pressing the "LOOK" key while in PARENT MODE. The display will blink "L". Instead of pressing one of the keys 1, 2, 3 or 4, the "ALLOW" key is pressed. The display will alternately blink "LA" and the current setting of the feature "1" or "0". When the display blinks "1" and "LA" the Roll Over feature is enabled so that the time remaining accumulates and rolls over into the next viewing period. When the display blinks "0" and "LA", the Roll Over feature is disabled so that time remaining does not carryover into the next viewing period. To change the setting of the Roll Over feature, one of the keys "1" or "0" is pressed. To exit back to PARENT MODE, press CLEAR or ENTER.

Idle Mode

IDLE MODE is entered from PARENT MODE (as a result of a time-out condition, or the use of the "ENTER" key), or from CHILD MODE (as a result of a time-out condition, the "ENTER" key, or the depletion of a child's time allowance). IDLE MODE is also entered as a result of AC power being restored to the device after a power failure in IDLE, PARENT, OR CHILD MODE.

In IDLE MODE, the power relay may or may not be energized, depending on the previous mode of the machine. IDLE MODE is denoted by none of the child or parent lights being illuminated.

i1. If the television is sensed to be on, pressing the "ENTER" key will de-energize the power relay, causing the television to go off.

i2. If the television is sensed to be off, the device de-energizes the power relay.

i3. If a valid child code is entered (4-digits from number keys), then the device checks the child's time account. If there is time remaining in that account, the relay is energized (power applied to television), and the device enters CHILD MODE. If there is no time remaining, the device enters CHILD MODE, but doesn't enable the television power (an error tone is sounded). In either case, the appropriate child light is illuminated when CHILD MODE is entered.

i4. If the parent code is entered, the device energizes the relay and goes into PARENT MODE.

i5. The "CLEAR" key is used to 'erase' any key presses, but has no other effect. Likewise, the other function keys ("LOOK," "FORCE," "ALLOW," AND "CODE") have no effect.

i6. If the device senses that AC power goes away, the device enters SLEEP MODE. When power is restored, the device will go to IDLE MODE, with the relay de-energized.

Child Mode

CHILD MODE is entered from IDLE MODE as a result of the entry of a valid child code.

In CHILD MODE, the relay may or may not be energized, depending on the balance present in the child's account when the code is entered (zero balance means relay is not energized). CHILD MODE is denoted by the illumination of one of the child lights on the device (with the parent light off).

c1. The "LOOK" key causes the device to display the time remaining in the child's account.
c2. The "ENTER" key causes the device to de-energize the power relay and go to IDLE MODE.
c3. While in CHILD MODE, the device senses the state of the television. If the television is turned on, then the child's account is debited on a minute-by-minute basis. (If the account goes to zero as a result, the devices de-energizes the relay and exits to IDLE MODE.)
c4. If the television is not turned on within some predetermined amount of time, the device de-energizes the power relay and exits to IDLE MODE.
c5. If the device senses that the television was switched off (i.e., it was on, then went off) then the relay is de-energized and the device goes to IDLE MODE.
c6. If the devices senses that AC power goes away, the device enters SLEEP MODE. When power is restored, the device will go to IDLE MODE, with the relay de-energized.

Sleep Mode

SLEEP MODE is entered from any other MODE as a result of the loss of AC power to the device. Batteries are used to maintain the time accounts, access codes, and time-of-day stored in the device's memory. All other functions (display, power relay, keyboard) are turned off to minimize drain on the batteries.

z1. SLEEP MODE maintains the time-of-day function of the device. At week's end, the accounts are automatically refreshed with the programmed allowances.
z2. SLEEP MODE periodically checks the state of the power supply. If it finds that AC power has been restored, it will resume normal operation, either at the start of SETUP MODE (if power failed while the device was in SETUP MODE) or in IDLE MODE (power failed in any other mode).

Master-Slave Architecture for Multiple Television Households

Figure 9:
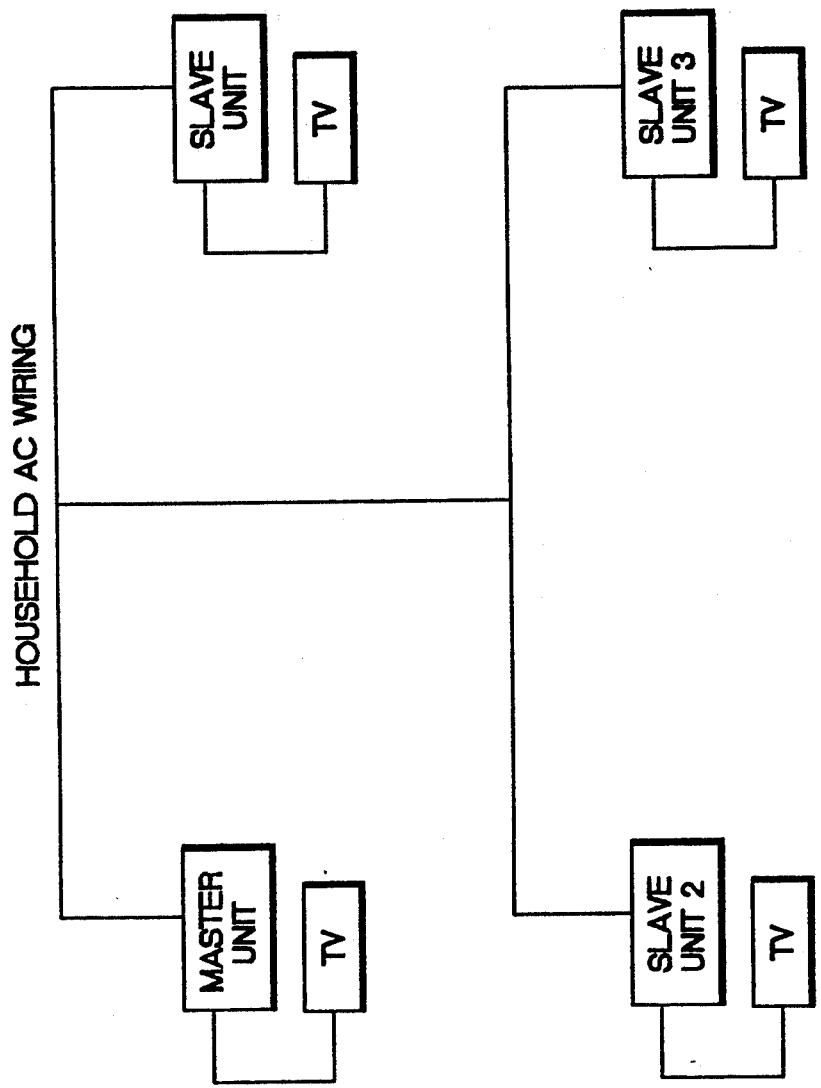
FIG. 9 is a schematic representation of a master-slave television control system utilized in a multiple television household.

To provide control of television viewing in households with more than one television, multiple television control devices (one per television) could be used. However, this leads to maintaining time accounts on several units or restricting television viewers to specific televisions. To solve this problem the control devices of the invention may be equipped with hardware and software which allow one device to act as a master unit (maintaining account balances), while the others in the house operate as slave units to the master unit (FIG. 9). Means must be provided to permit the master and slave units to communicate. In the preferred embodiments, a bit-serial, asynchronous, polled communications technique is utilized, in which the master unit broadcasts commands to the slaves, which respond to the commands by broadcasting status information.

Figure 14:
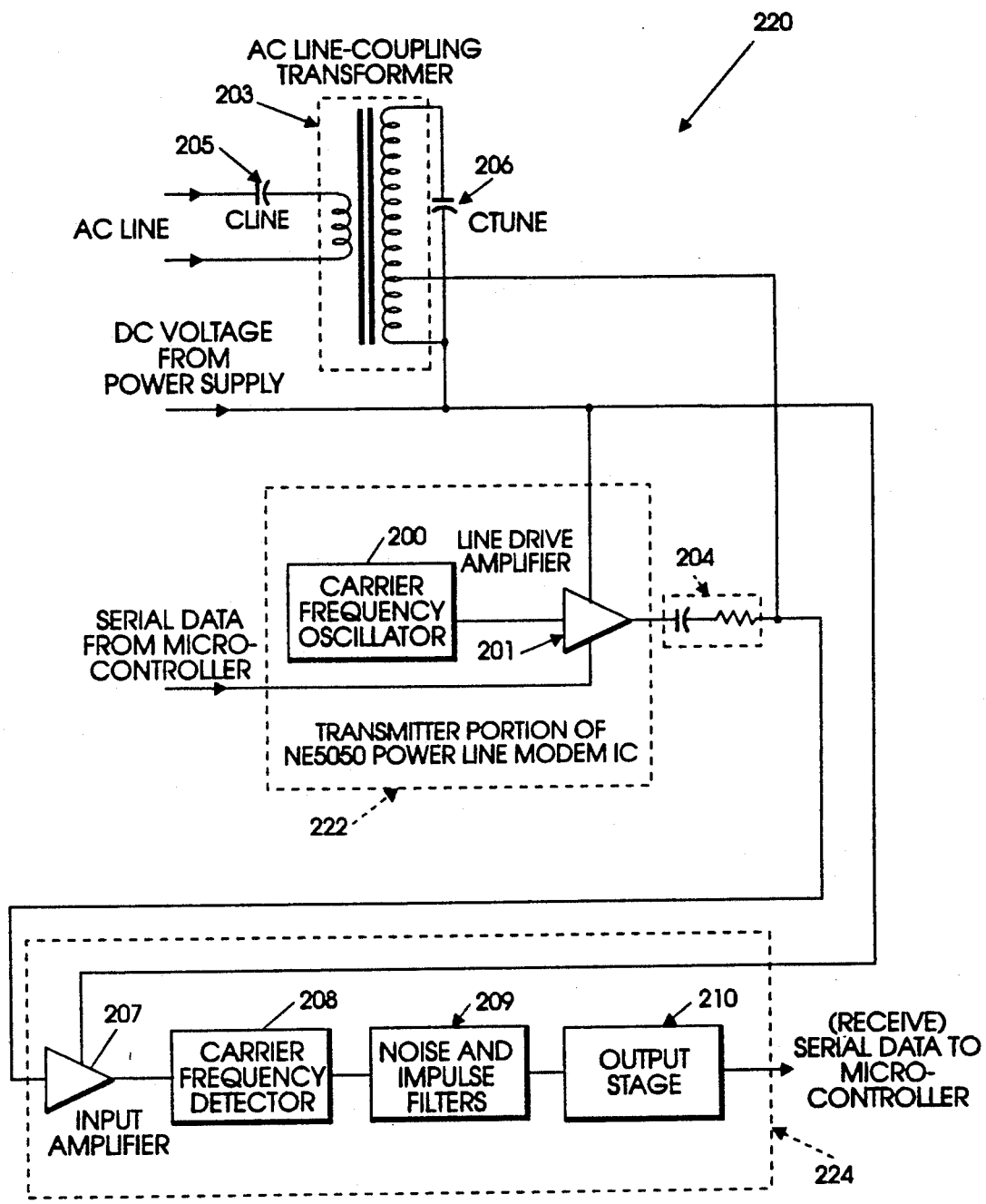
FIG. 14 is a schematic representation of the power line modem system utilized in the data communications system for the master-slave system.

While communication (between master and slave units) using infrared (IR) radiation or low-power radio frequency (RF) techniques is possible, it has been found that communication through the household AC wiring is a desirable means. Thus, the master unit and each slave unit must include a power line communications interface, which preferably takes the form of a power line modem 220 (FIG. 14). In preferred embodiments, the Signetics Model No. NE5050 power line modem IC, manufactured by Signetics Corporation of Sunnyvale, Calif., U.S.A., along with Signetics' recommended circuitry that is well known in the art, has been used as the basis for reliable power line communications.

Power line modem 220 consists of two sections. One section is used for sending data from the unit (either master or slave) to other remote units; it is referred to as transmitter 222. The second section of the power line modem is the receiver 224, and it is used for reception of data sent by other remote units.

Transmitter 222 consists of an oscillator 200, which generates a radio-frequency signal (100 KHz in the preferred embodiments). The output of the oscillator is fed to a Line Drive amplifier 201, the output of which is enabled or disabled by the serial transmit data output from the microcontroller 84. The output of amplifier 201 is fed to line-coupling transformer 203 through an impedance-matching resistor-capacitor network 204. Capacitor 205 connects the transformer 203 to the AC line; it serves as a filter to attenuate the 60 Hz power-line frequency and pass the carrier frequency. Thus, while transmitting data, the power line modem impresses a carrier frequency onto the household wiring. Capacitor 206 on the transformer 203 secondary serves to turn the transformer response to the carrier frequency.

The receiver section 224 consists of an amplifier 207, frequency detector 208, noise and impulse filters 209, and an output stage 210. This section detects the presence of the carrier frequency on the AC power lines, and converts that information into a serial data stream which is fed into the microcontroller.

Figure 11:
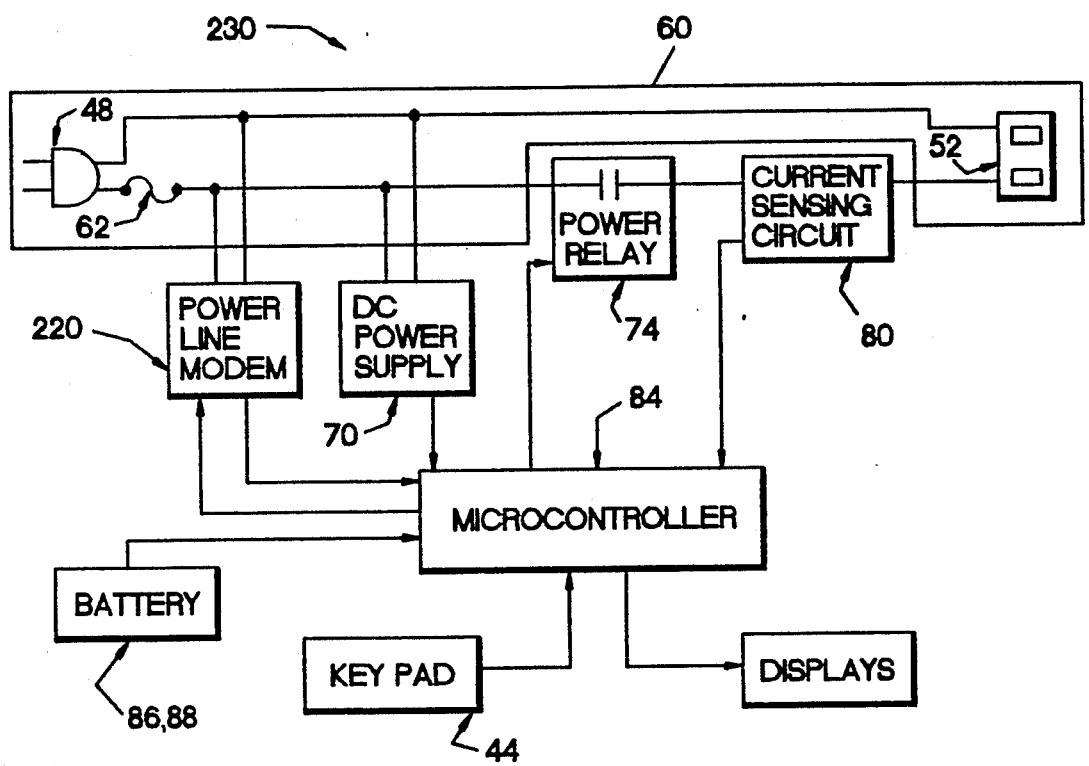
FIG. 11 is a block diagram of a master unit.

The master unit is responsible for maintaining account balances (remaining time), debiting the appropriate account while the television is turned on, and enabling/disabling television viewing at the remote televisions. As shown in FIG. 11, master unit 230 is similar to the basic non-communicating device, with the addition of the aforementioned power line modem 220.

Three types of remote slave units are defined: Intelligent, Non-Intelligent, and Secondary-Master. In all cases, slaves are equipped with communications means which allow the reception of commands from a master device and the transmission of status back to that same device.

Figure 10:
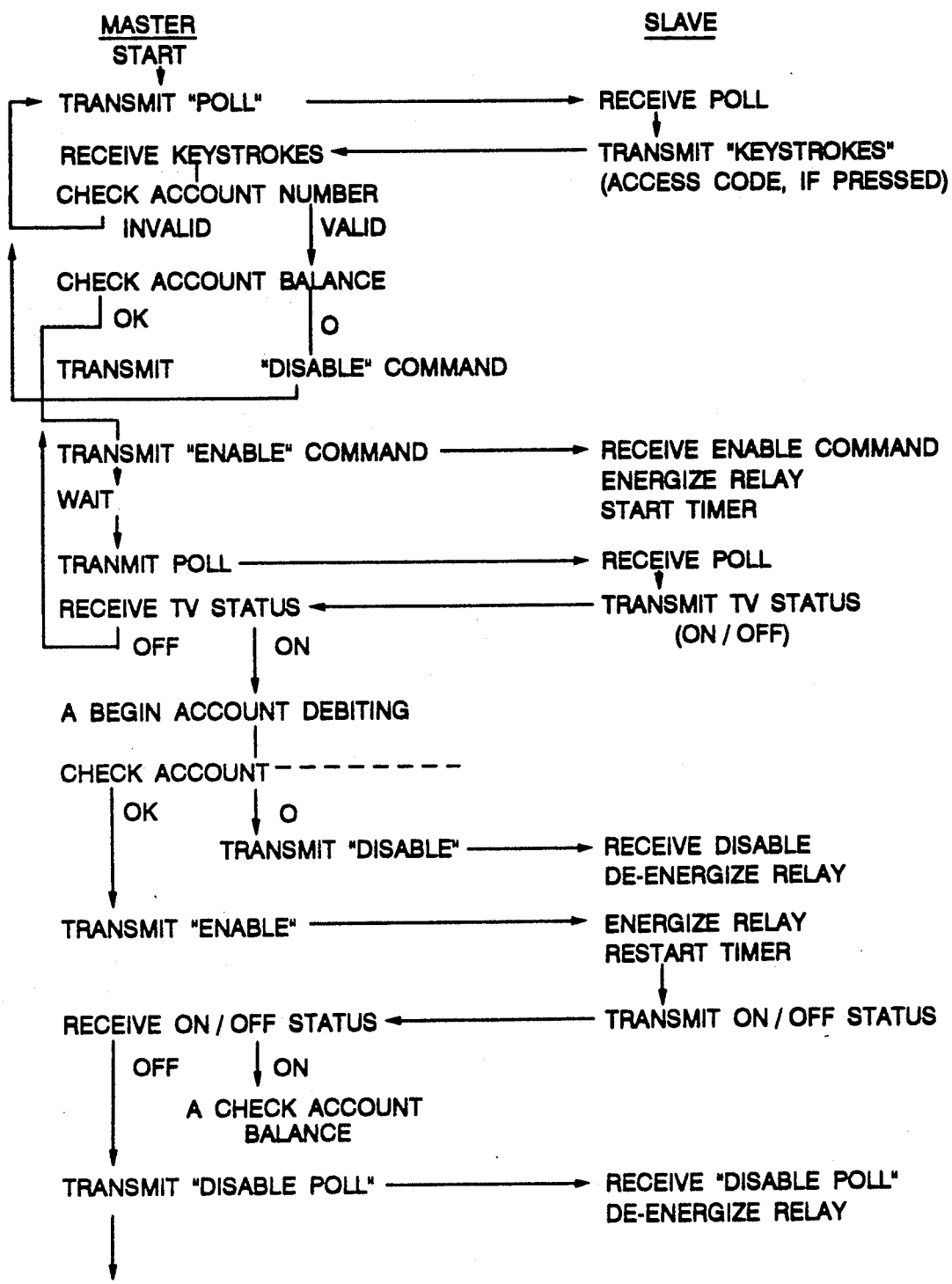
FIG. 10 is an operational flow chart for the master-slave system.
Figure 12:
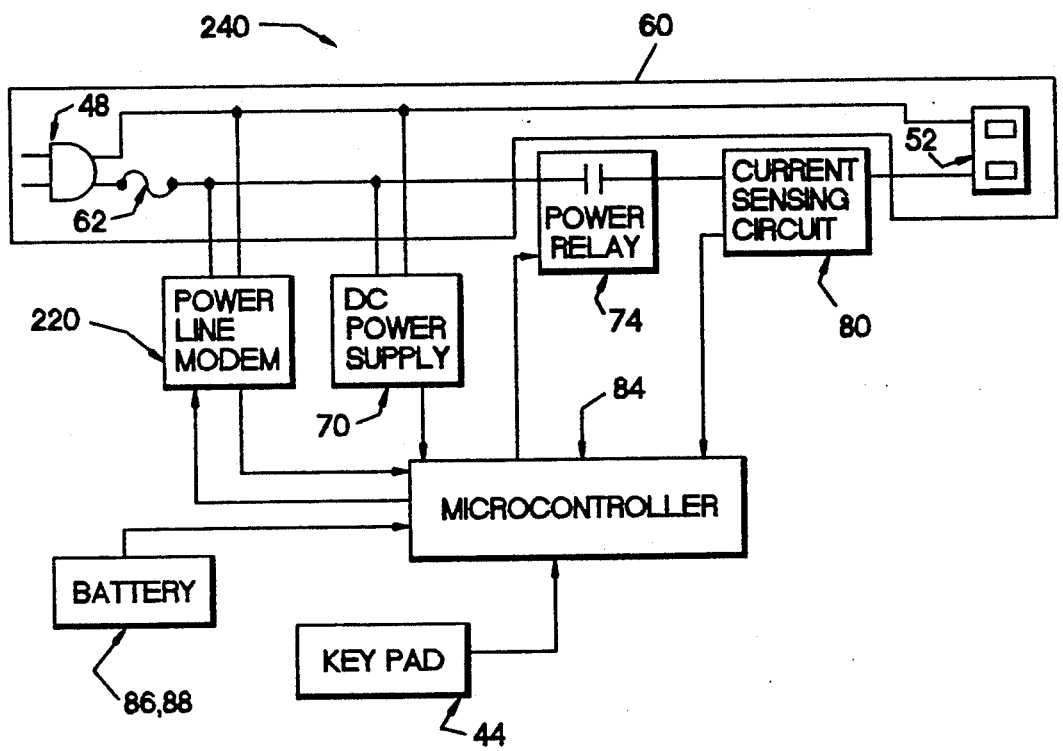
FIG. 12 is a block diagram of an intelligent slave unit.

Referring to FIG. 12, the intelligent remote unit 240 looks like the master unit, but with no display. It controls power to its television, and includes current sensing circuitry for sensing whether the television is actually on. A child operates the television just as he would with a normal television control device attached (by entering a four-digit code). The code which was entered is transmitted to the master unit, which verifies it to be valid, checks the account, and transmits an enabling signal to the slave. Upon receipt of the enabling signal, the slave energizes the power relay, and then begins to sense whether the television is turned on. Subsequently, the master will interrogate or "poll" the slave unit, which sends the television status (on/off) in response to the poll. If the account balance decrements to zero, then the master transmits a disable command to the slave, causing the slave to de-energize the relay. More details of the master/slave operational sequence are contained in the flowchart of FIG. 10.

Figure 13:
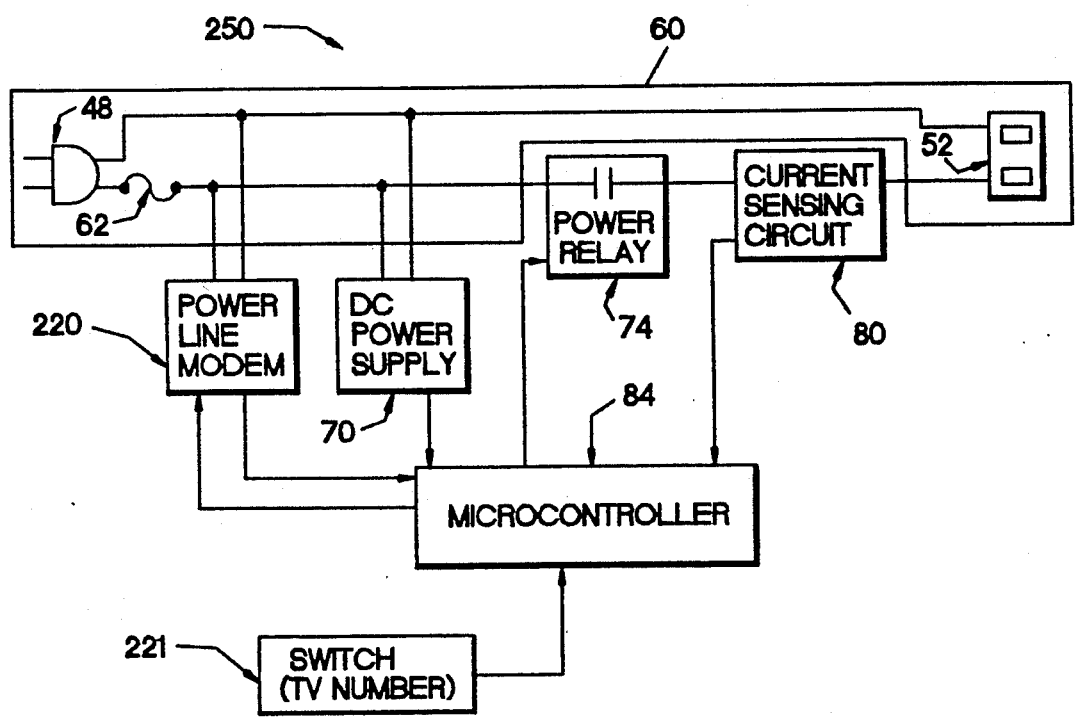
FIG. 13 is a block diagram of a non-intelligent slave unit.

The non-intelligent slave unit 250 (FIG. 13) is similar in appearance, but with no display, keypad, or battery. In place of the battery is a means for selecting the communication address (television number) of the device; in the preferred embodiment, this is a multiple-position switch 221 located in the battery compartment. The child wishing to watch television must enter his code, plus a television number code, at the master unit. After validation of code and account balance, the master unit sends an enabling command to the slave, which energizes the television power relay. Subsequently, the slave responds to interrogation polls from the master unit with the status of the television (on/off).

The Secondary-Master unit (not illustrated) works in a manner similar to the master unit. However, it will wait for the master unit to send a special (release-link-to-secondary-master) poll before it polls, enables or disables its slave units. When the Secondary-Master has finished with its slave units, it sends a special (release-link-to-primary-master) poll that enables the primary master to either communicate with its slave units or to release the link to the next Secondary-Master unit. In one specific embodiment of the invention, each Master-Unit may communicate with up to four Slave-Units and up to three other Secondary-Master units. Each poll by a Master-Unit or Secondary-Master-Unit contains addressing information so that the Slave-Units and other Master-Units can identify when the poll is addressed to that unit.

In the case of both intelligent and non-intelligent slave systems, the master unit continuously polls the slave unit to maintain the relay-energized condition. If polling stops for some predetermined time interval, the slaves automatically de-energize their relays.

Thus, it can be seen that the master unit communicates with one or more slave units by using the following commands:

| | |
|---|---|
| POLL from Master-Unit | enable slave unit |
| | enable slave unit and sound tone |
| | disable slave unit |
| | disable slave unit and sound tone |
| | release link to Secondary-Master-Unit (from Master) |
| | release link to Master-Unit (from Secondary-Master) |
| RESPONSE from Slave-Unit | current flowing through device |
| | current not flowing through device |
| | keystroke pressed at the device |

A slave unit responds to all of these commands with states that include television on/off and key stroke data.

"Nominally On" Control Device

As mentioned above in connection with the detailed discussion of the current sensing circuit, one advantage of current sensing is that it permits the control device to be designed for "nominally on" operation. A nominally on operation is one in which the power relay 74 is always closed except in those cases where unauthorized access to the television is attempted; for example, a child who tries to watch television beyond his allowance. The advantage of nominally on operation is that AC power is normally available to the television, even in the Idle Mode. Thus, televisions with volatile memory capabilities for storing time of day, preferred channels, etc. do not lose information. In the operation of a nominally on control device, the device may be provided with an audible alarm that sounds during an attempt at unauthorized access, giving the viewer a period of, say, twenty seconds to discontinue the unauthorized access by turning off the television. If the television is not turned off in twenty seconds, as detected by the current sensing circuit, then and only then does the device serve to open power relay 74 and interrupt AC power to the television.

While specific embodiments of the invention have been disclosed, it will be appreciated that modifications may be made without departing from the true spirit and scope of the invention.

That which we claim is:

1. A device for limiting the amount of time a television may be viewed by a plurality of viewers to a predetermined allowance for each viewer, said device being connected in the power supply line to the television under control and serving to enable the power connection to the television when an authorized viewer has allowance time remaining, said device being characterized by the ability to sense the on/off status of the television to assure convenient and trustworthy operation of the device in an actual residential setting, said device comprising:

a microcontroller including a stored program, memory for storing an access code and a time account for each of a plurality of viewers, a means for accurately keeping time and means for executing the stored program;

data entry means or supplying user input to the microcontroller;

power input and output means connecting said device to an AC power source and the television under control;

means for enabling the power connection or interrupting power to the television under control according to instructions from the microcontroller;

means for providing information to the microcontroller concerning the on/off status of the television under control; and means responsive to the television on/off status information for assuring that a viewer's time account is debited only during periods when the television is ON.

2. A device as claimed in claim 1 wherein said means for providing information concerning the television on/off status comprises a current sensing circuit.

3. A device as claimed in claim 2 wherein said current sensing circuit includes circuitry means operative in a voltage coupling mode.

4. A device as claimed in claim 2 wherein said current sensing circuit includes circuitry means operative in a current coupling mode.

5. A device as claimed in claim 2 wherein said current sensing circuit includes a resistor through which the television current induces a voltage and an associated opto-isolator that is turned on when the induced voltage exceeds a predetermined turn-on voltage.

6. A device as claimed in claim 1 including means associated with said timekeeping means for defining a viewing period over which the time account may be used and means for replenishing the time account at the conclusion of the viewing period.

7. A device as claimed in claim 6 wherein said means for replenishing the time account at the conclusion of the viewing period permits the roll over of unused time into the next successive viewing period so that the device enables saving of time from one viewing period to the next.

8. A device for limiting the amount of time a television may be viewed by a viewer to a predetermined allowance, said device being connected in the power supply line to the television under control and serving to enable the power connection to the television when the viewer has allowance time remaining, said device being characterized by the ability to sense the on/off status of the television to assure convenient and trustworthy operation of the device in an actual residential setting, said device comprising:

a microcontroller including a stored program, memory for storing an access code and a time account for the viewer, a means for accurately keeping time and means for executing the stored program;

data entry means for supplying user input to the microcontroller;

power input and output means connecting said device to an AC power source and television under control;

means for enabling the power connection or interrupting power to the television under control according to instructions from the microcontroller;

means for providing information to the microcontroller concerning the on/off status of the television under control;

means responsive to the television on/off status information for assuring that the viewer's time account is debited only during periods when the television is ON; and said microcontroller serving to define:

a SETUP mode for permitting the entry of time of day, day of week, a child access code for each viewer and a time allowance for each viewer; and a CHILD mode that is entered upon entry of a viewer's valid child access code and in which mode the means for providing information concerning the television on/off status permits debiting of the viewer's time account for so long as the television is ON.

9. A device as claimed in claim 8 wherein said microcontroller further defines:

an IDLE mode that is entered following the SETUP mode, or following switching OFF of the television when in CHILD mode or following the exhaustion of the viewer's allowance while in CHILD mode.

10. A device as claimed in claim 9 wherein said microcontroller further defines:

a PARENT mode accessed by a valid parent code that permits free television viewing time.

11. A device as claimed in claim 9 wherein said device includes battery means and wherein said microcontroller defines a SLEEP mode that is entered as a result of loss of AC power to said device and in which mode said battery means is used to maintain the time accounts, access codes and time of day stored in memory.

12. A device for limiting the amount of time an electrical appliance may be used by a plurality of users to a predetermined allowance for each user, said device being connected in the power supply line to the electrical appliance under control and serving to enable the power connection to the electrical appliance when an authorized user has allowance time remaining, said device being characterized by the ability to sense the on/off status of the electrical appliance to assure convenient and trustworthy operation of the device in an actual residential setting, said device comprising:

a microcontroller including a stored program, memory for storing an access code and a time account for each of a plurality of users, a means for accurately keeping time and means for executing the stored program;

data entry means for supplying user input to the microcontroller;

power input and output means connecting said device to an AC power source and the electrical appliance under control;

means for enabling the power connection or interrupting power to the electrical appliance under control according to instructions from the microcontroller;

means for providing information to the microcontroller concerning the on/off status of the electrical appliance under control; and means responsive to the electrical appliance on/off status information for assuring that a user's time account is debited only during periods when the electrical appliance is ON.

13. A system for limiting the amount of time a plurality of televisions may be viewed by a viewer to a predetermined allowance, said system comprising a master control device associated with one television and a slave control device associated with each of the other televisions, each control device being connected in the power supply line to its respective television and serving to enable the power connection to its television when the viewer has allowance time remaining, each master and slave device being characterized by the ability to sense the on/off status of its respective television to assure convenient and trustworthy operation of the system in an actual residential setting, said master control device comprising:

a microcontroller including a stored program, memory for storing an access code and a time account for the viewer, a means for accurately keeping time and means for executing the stored programmed;

data entry means for supplying user input to the microcontroller;

power input and output means connecting the master control device to an AC power source and its respective television;

means for enabling the power connection or interrupting power to its respective television according to the instructions from the microcontroller;

means for providing information to the microcontroller concerning the on/off status of its respective television; and means for permitting data communications between the master control device and each slave control device;

each said slave control device comprising:

power input and output means connecting the slave control device to an AC power source and its respective television;

means for enabling the power connection or interrupting power to the slave device's respective television according to the instructions from the master control device microcontroller;

means for providing information to the microcontroller concerning the on/off status of the slave device's respective television; and means for permitting data communications between the slave control device and the master control device.

14. A system as claimed in claim 13 wherein the means for providing information concerning the on/off status comprises a current sensing circuit.

15. A system as claimed in claim 13 wherein the means for permitting data communications comprises a power line modem and associated circuitry enabling communication through residential AC wiring.

16. A system as claimed in claim 13 wherein said slave control device is an intelligent device having data entry means permitting the viewer to operate a television associated therewith without viewer access to the master control device.

17. A system as claimed in claim 13 wherein said slave control device is a non-intelligent device requiring that the viewer access the master control device prior to viewing the television associated with the slave control device.

18. A device as claimed in claim 13 wherein said means for permitting data communication carries an enabling signal provided by the master control device's microcontroller to a slave control device upon entry and verification of a valid access code and carries a periodic slave television on/off status signal from the slave control device to the master control device.

19. A device as claimed in claim 18 including means at each unit responsive to the unit's television on/off status information for assuring that the viewer's time account is debited only during periods when the television is ON.

* * * * *